Figure 9:

F. L. MORSE.
DRIVE CHAIN.
APPLICATION FILED JAN. 31, 1907.
1,115,960.
Patented Nov. 3, 1914.
3 SHEETS—SHEET 1.
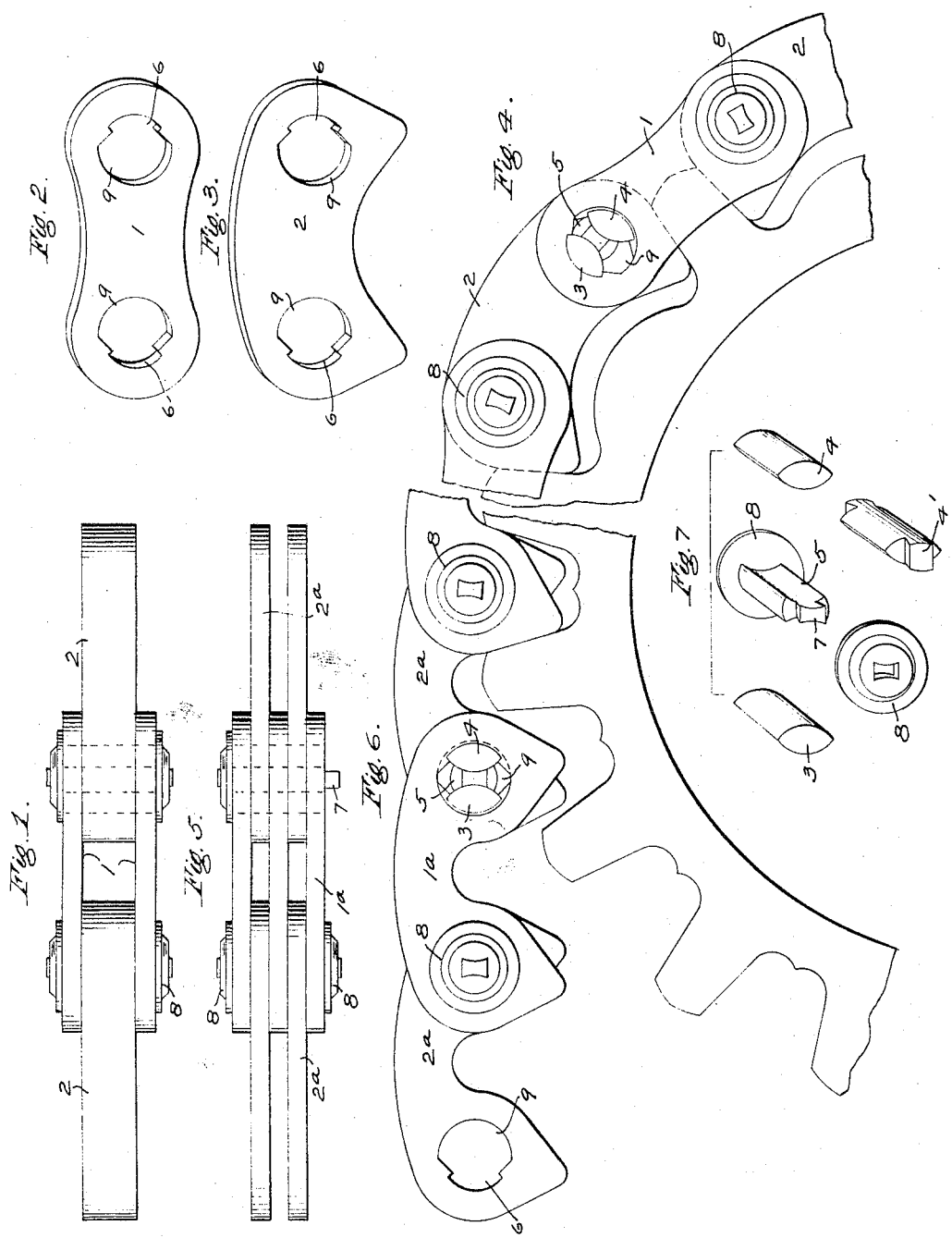
WITNESSES
INVENTOR
Frank L. Morse
by E. Wright
Atty.

F. L. MORSE.
DRIVE CHAIN.
APPLICATION FILED JAN. 31, 1907.

1,115,960.

Patented Nov. 3, 1914.
3 SHEETS—SHEET 2.

WITNESSES
J. Custis
J. B. MacDonald

INVENTOR
Frank L. Morse
by E. Wright
Atty.

F. L. MORSE.
DRIVE CHAIN.
APPLICATION FILED JAN. 31, 1907.

1,115,960.

Patented Nov. 3, 1914.

3 SHEETS—SHEET 3.

WITNESSES
J. S. Custer
J. B. MacDonald

INVENTOR
Frank L. Morse
by E. H. Wright
Atty.

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

DRIVE-CHAIN.

1,115,960.  Specification of Letters Patent.  Patented Nov. 3, 1914.

Application filed January 31, 1907. Serial No. 355,041.

*To all whom it may concern:*

Be it known that I, FRANK L. MORSE, a citizen of the United States, residing at Ithaca, in the county of Tompkins and States of New York, have invented new and useful Improvements in Drive-Chains, of which the following is a specification.

This invention relates, in general, to drive chains for power transmission, and more particularly to the joints for such chains, the principal object being to increase the bearing area between the relatively moving surfaces in contact during the flexing of the joint. In chains of this character a bearing surface between the relatively movable parts of the joint extending substantially the full width of the chain, has been provided by forming the parts of the joint in separate pieces extending through the links of the chain, and according to one construction the joint has been composed of two side pintle members, or segmental bushings, extending transversely through the chain links, each member being mounted in and adapted to turn with one of the adjacent links, and a central pin member inserted between the oppositely facing bearing surfaces of the two side pintles, or bushings, and adapted to turn upon either of them as the joint is flexed. But with such a construction, the relative movement between the parts of the joint normally occurs upon one side only of the central pin member at each or any one particular bending movement of the links; that is to say, while the relative movement may at one time occur between the central pin and the bearing surface of one of the bushings or side pintle parts, and at another time between the central pin and the other of the bushings, it does not ordinarily at any time turn simultaneously upon both of these bearing surfaces, and consequently the maximum area of bearing surface which may be considered as being available and active at each flexing of a joint, is limited to the length or area of one side pintle or bushing where it engages the central pin member of the joint.

According to my present improvement, a relative movement is produced upon both sides of the central pin at the same time and at each bending movement of the joint, whereby the active bearing surface participating in each flexing movement of the chain extends between both of the side bearing surfaces and opposite sides of the central pin. In this manner the extent of actual bearing surface between which relative movement simultaneously occurs at each flexing action of the joint is doubled in area, while substantially one-half of the necessary movement takes place upon each side of the central pin, and the speed or rate of movement between said engaging surfaces is only one-half as much as in the former type of chain construction. With this greatly increased area of active bearing surface the wearing qualities of the joint will be correspondingly increased and the life of the chain prolonged.

My improvement is applicable to various forms of drive chains, wherein a central pin member is employed at the joint and has bearing surfaces upon opposite sides for engaging corresponding bearing surfaces carried by adjacent links of the chan.

Figure 10:
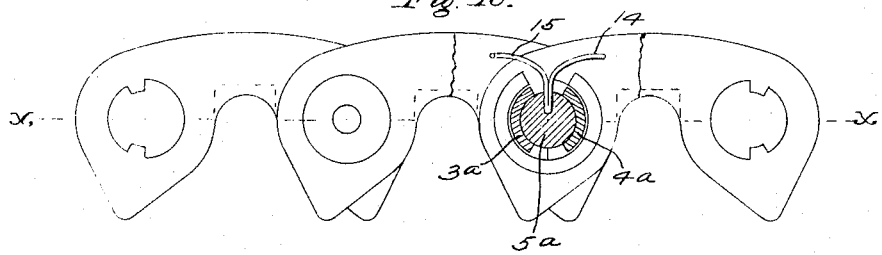
Figure 11:
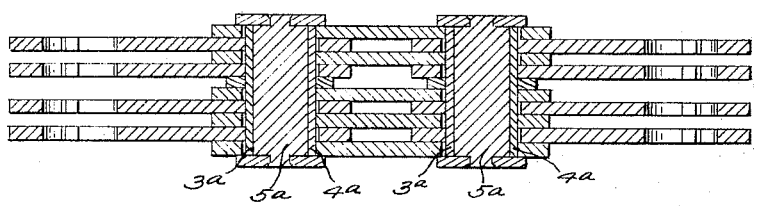
Figure 8:
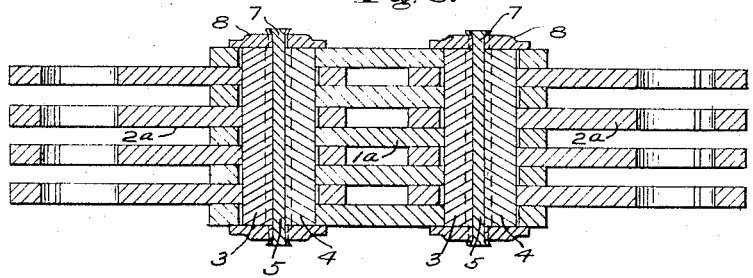
Figure 12:
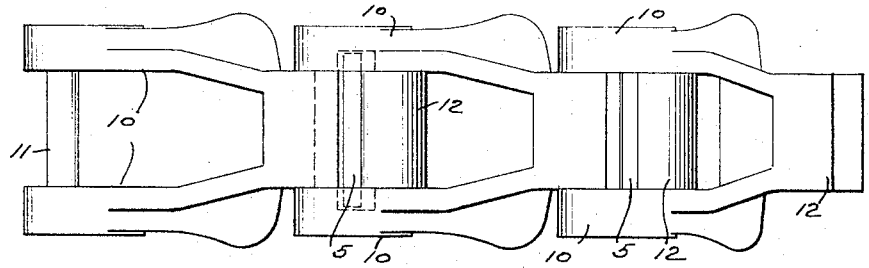
Figure 13:
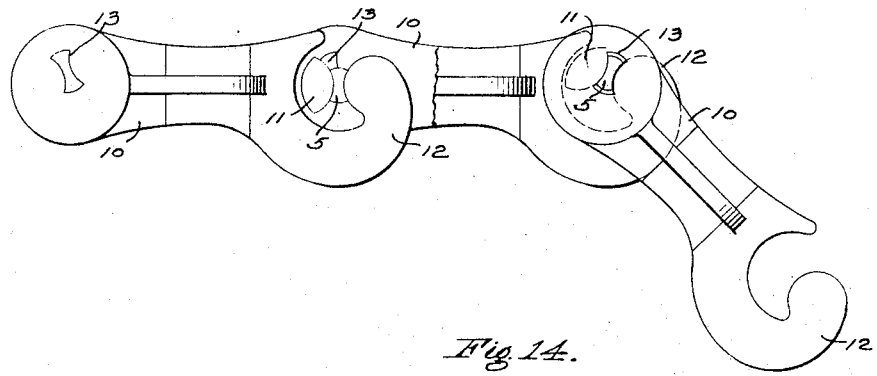

In the accompanying drawings; Figure 1 is a plan view of three links of a chain of the block-link type; Figs. 2 and 3 perspective views of the links of the chain illustrated in Fig. 1, and showing the formation of the apertures at the ends of the plates; Fig. 4 a side view of said links mounted on a portion of a sprocket wheel and showing one form of joint construction embodying my improvements; Fig. 5 a plan view of three links of a multiplate type of drive chain; Fig. 6 a side view thereof applied to a portion of a sprocket wheel; Fig. 7 a perspective view showing in detail the separated parts of the chain joint, and also a slight modification of one of them; Fig. 8 a horizontal section of three links of a multiplate chain having joints corresponding to the chain shown in Figs. 5 and 6, but composed of links formed of a larger number of plates; Fig. 9 a plan view of a portion of a multiplate chain having a modified form of joint embodying my invention; Fig. 10 a side view of the same with one joint shown in section; Fig. 11 a horizontal section of the same on the line $x$—$x$ of Fig. 10; Fig. 12 a plan view of a portion of a modified form of chain embodying my improved joint construction; Fig. 13 a side view of the same; and Fig. 14 a vertical section of one of the link members.

According to the construction shown in Figs. 1 to 4, inclusive, my improvement is illustrated as applied to a block link chain, wherein the adjacent links are composed of two side plates, 1, and an intermediate block link, 2, adapted to engage the sprocket teeth at its ends, and while the bearing surfaces for the central pin member of the joint may be formed integrally upon the link plates, I prefer to insert separate side bearing pieces, or pintle parts, 3 and 4, (see Fig. 7) and for this purpose apertures are formed in the ends of the link members adapted to hold in place one of the side pintle parts and provide clearance for the free movement of the other side pintle part and the central pin member, 5, which extend through the apertures. According to the preferred construction, the link members, or the side pintle parts, 3 and 4, are provided with convex bearing surfaces, while the central pin member, 5, has corresponding concave bearing surfaces upon its opposite sides for engaging with the side bearing pieces, as shown in Fig. 7.

The side pintle parts, 3 and 4, may be made in double convex form, so that either face is adapted to fit the concave surfaces of the central pin, 5, and the apertures in the link members are preferably formed of a corresponding shape having a curved or notched portion, 6, at one side adapted to receive the section of one of the side pintle parts.

The central pin member, 5, may be provided with shouldered ends, 7, projecting to receive the washers, 8, for holding the parts together at the joint; or, if preferred, these shouldered ends may be formed on one of the side pintle parts, an indicated at 4′, Fig. 7. The enlarged portion, 9, of the apertures allows for the free movement of the other side pintle member and also for the lateral play of the central pin member, since this member will be subjected to a slight lateral movement in substantially a radial direction with reference to the sprocket wheel as the joint bends in passing on to and off from said wheel. The application of this construction of joint to a multiplate chain wherein the links are composed of arch-shaped plates interspersed upon the pintles with plates of adjacent links, is illustrated in Figs. 5, 6 and 7. In this design, the plates, 1$^a$ and 2$^a$, comprising adjacent links, are formed with apertures similar to those schown in Figs. 2 and 3, in which the pintle parts, 3, 4 and 5, are mounted as before described, that is, one of the side pintle parts, as 3, is held in place in the apertures of the plates 1$^a$ of one link, while the other side pintle part, 4, is held in place in the apertures of the plates 2$^a$ of the adjacent link, and the central pin member, 5, having the double concave surfaces is located in the apertures between the convex surfaces of the side pintles and has a moving bearing engagement with both of said surfaces simultaneously as the joint bends.

Figure 14:
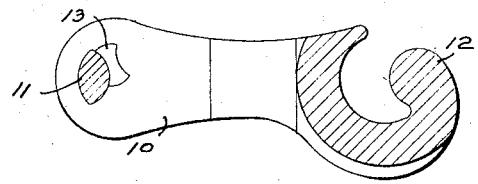

As illustrated in Figs. 12, 13 and 14, my improvement is applied to a conveyer type of chain, wherein the links are each composed of integral members formed with two side bar portions, 10, joined by a cross-bar, 11, at one end and having a hook-shaped projection, 12, at the other end. One of the side convex bearing surfaces for the joint may be formed on the cross-bar, 11, and the other side convex bearing surface on the hook-shaped projection 12, while the central pin, 5, may be conveniently slipped through an opening 13 in one of the side bars and inserted between said side bearing surfaces.

In the joints for the different types of chains, as thus far described, the central pin member engages by its double concave surfaces with the convex or partly cylindrical surfaces of the two side pintle parts, so that as the joint bends a relative moving engagement exists at both of said bearing surfaces at the same time, since the convex surface of one link turns upon or in the concave bearing on one side of the central pin and causes the pin to turn upon the other side bearing surface, the movement upon each side being only one-half the angular movement made between the adjacent links. The area of the effective bearing surface upon which each joint articulates is thereby greatly increased, since it extends double the length of the central pin, and the rate of movement of one surface of the joint upon another is greatly diminished.

By means of the construuction of the central pin in a double concave section, it is restrained from turning completely with either of the side bearing surfaces and is caused to effect a relative movement simultaneously upon both of them while maintaining a substantial radial position with respect to the sprocket wheel. The same advantages may also be produced to some extent with a central pin member, 5$^a$, of substantially cylindrical section having two opposite convex bearing surfaces engaging corresponding concave bearings on the side pintle parts, or bushings, 3$^a$ and 4$^a$, as indicated in Figs. 9, 10 and 11 of the drawings, if means are provided for restraining the central pin member from turning completely with one of the side pintle parts and requiring the said central pin to effect a relative movement upon both bearing surfaces simultaneously equal to substantially one-half of the total angular movement. As shown in Figs. 9 and 10, this may be accomplished by providing a spring device having two leaves, 14 and 15, one attached to the plates of one link and the other to the plates of the adjacent link, while the center of the spring is connected to the center pin, 5$^a$. As this joint is flexed one side pintle, or bushing, turns partly upon the center pin, but the spring is at the same time stretched upon one side, which causes a partial movement of the center pin in the bearing surface of the other side pintle or bushing, thereby providing a bearing in which substantially one-half the movement necessary for the joint to flex, takes place upon each side of the central pin member, so that the bearing surface between the relatively moving parts of the joint extends twice the length of the central pin member.

Having now described my invention, what I claim as new, and desire to secure by Letters Patent, is:—

1. An oscillating joint for chains, comprising two parts, or links, adapted to be hinged together, and each provided with a bearing surface, and a central bearing member having a positive movement relative to both the side bearing surfaces as the joint bends.

2. An oscillating joint for chains, comprising two parts, or links, adapted to be hinged together and each provided with a bearing surface, and a central bearing member inserted between said surfaces, the central member being restrained from turning with either one of the side surfaces, whereby positive relative movement must occur between the central member and both said side bearing surfaces at each flexing of the joint.

3. An oscillating joint for chains, comprising adjacent link members carrying oppositely curved bearing surfaces and a central bearing pin inserted between said surfaces and adapted to engage both surfaces with a positive relative sliding movement at each flexing of the joint.

4. In a joint for chains, the combination with two adjacent links carrying bearing surfaces, of a central pin member provided with corresponding oppositely located bearing surfaces and having a positive movement relative to both of the link bearing surfaces each time the joint bends.

5. In a joint for chains, the combination with two adjacent links carrying convex bearing surfaces, of a central pin member connecting said links and provided with corresponding concave bearing surfaces.

6. In a joint for chains, the combination of adjacent links comprising two side pintle parts, each engaging and turning with one of said links and having a bearing surface, and a central pin member having corresponding bearing surfaces on opposite sides, the construction being such that a relative movement is positively effected simultaneously on the opposite bearing surfaces of the center pin as the joint bends.

7. In a joint for chains, the combination of one link member having an aperture, an adjacent link member also having an aperture, and a central pin member located in said apertures, and having a positive movement simultaneously upon the bearing surfaces in both of said apertures as the joint bends.

8. In a joint for chains, the combination of one link member having an aperture one wall of which forms a convex bearing surface, an adjacent link also having an aperture one wall of which forms a convex bearing surface, and a central pin member located in said apertures and having a corresponding double concave bearing surface engaging the corresponding convex bearing surfaces of the adjacent links.

9. In a joint for chains, the combination of one link member having an aperture one wall of which forms a convex bearing surface, an adjacent link also having an aperture, a separate pintle part having a convex bearing surface extending through said apertures, and a central pin member also extending through the apertures and having opposite concave bearing surfaces engaging said convex bearing surfaces.

10. In a drive chain, the combination of adjacent links composed of a plurality of plates formed with apertures at their ends, a side pintle part extending through said apertures and engaging the plates of one link, another side pintle part located in said apertures and engaging with the plates of the adjacent link, and a central pin member extending through said apertures, the construction being such as to force the central pin to turn partly upon each of these side pintle parts as the joint bends.

11. In a drive chain, the combination of adjacent links composed of a plurality of plates formed with apertures at their ends, a side pintle part having a convex bearing surface extending through said apertures and engaging with the plates of one link, another side pintle part with a convex bearing surface and engaging with the plates of the adjacent link, and a central pin member located between said side pintle parts and having a double concave bearing surface.

12. In a drive chain, the combination with adjacent link members formed with apertures at their ends, of two side pintle parts each engaging with one of the link members and having a double convex surface, and a central pin member having two concave bearing surfaces.

13. In a drive chain, the combination with adjacent links formed of a plurality of plates having apertures at their ends, and two side pintle parts and a central pin member extending through said apertures, each of the latter being formed to rigidly hold in place one of the side pintle parts and allow free movement of the other parts, the construction being such as to cause the center pin to turn upon both of the side pintle parts at each articulation of the joint.

14. In a drive chain, the combination with adjacent links formed of a plurality of plates having apertures at their ends, two side pintle parts each having a convex bearing surface, a central pin member located between the same and having two corresponding concave bearing surfaces, the apertures in said plates being formed to rigidly hold in place one of the side pintle parts and allow free movement of the other parts.

In testimony whereof I have hereunto set my hand.

FRANK L. MORSE.

Witnesses:
P. C. COLT,
D. B. PERRY.